(12) United States Patent
Ditthavong

(10) Patent No.: US 6,736,435 B1
(45) Date of Patent: May 18, 2004

(54) DING AND DENT PREVENTION SYSTEM

(76) Inventor: Phouphanomketh Ditthavong, 7750 Clifton Rd., Fairfax Station, VA (US) 22039

( * ) Notice: Subject to any disclaimer, the term of this patent is extended or adjusted under 35 U.S.C. 154(b) by 0 days.

(21) Appl. No.: 10/354,979

(22) Filed: Jan. 31, 2003

Related U.S. Application Data

(60) Provisional application No. 60/352,560, filed on Jan. 31, 2002.

(51) Int. Cl.[7] .............................. B60R 19/42
(52) U.S. Cl. ...................... 293/128; 293/143
(58) Field of Search ............... 293/126, 127, 293/128, 121, 143

(56) References Cited

U.S. PATENT DOCUMENTS

| | | | | |
|---|---|---|---|---|
| 2,734,765 A | * | 2/1956 | Henderson | 293/128 |
| 2,889,165 A | | 6/1959 | Zientara | |
| 3,243,223 A | * | 3/1966 | Hoshell | 49/460 |
| 3,473,836 A | * | 10/1969 | Halter | 293/107 |
| 3,659,887 A | * | 5/1972 | Marquette | 293/128 |
| 3,738,695 A | * | 6/1973 | McBee | 293/128 |
| 4,002,363 A | | 1/1977 | James | |
| 4,277,526 A | * | 7/1981 | Jackson | 428/31 |
| 4,401,331 A | * | 8/1983 | Ziner et al. | 293/128 |
| 4,530,519 A | * | 7/1985 | Marshall | 280/770 |
| D299,819 S | * | 2/1989 | Katz et al. | D12/167 |
| 4,828,303 A | * | 5/1989 | Soria | 293/128 |
| 4,871,205 A | | 10/1989 | Bray | |
| 4,879,543 A | * | 11/1989 | Smith, Sr. | 340/473 |
| 5,149,166 A | * | 9/1992 | Wille et al. | 293/128 |
| 5,333,923 A | * | 8/1994 | Whitfield | 293/128 |
| 5,799,992 A | * | 9/1998 | Kojima | 293/128 |
| 6,179,205 B1 | | 1/2001 | Sloan | |
| 6,186,564 B1 | * | 2/2001 | Ashcroft | 293/128 |
| 6,247,734 B1 | * | 6/2001 | Hamilton et al. | 293/128 |

* cited by examiner

*Primary Examiner*—D. Glenn Dayoan
*Assistant Examiner*—Patricia L. Engle
(74) *Attorney, Agent, or Firm*—Ditthavong & Carlson, P.C.

(57) ABSTRACT

An approach is provided for minimizing dings and dents on the side of a vehicle. A protective apparatus includes telescopic members attachably engaged on the edges of a door of a vehicle, wherein the height of the apparatus is adjustable.

20 Claims, 4 Drawing Sheets

DING AND DENT PREVENTION SYSTEM

RELATED APPLICATIONS

The present application claims the benefit of U.S. Provisional Patent Application Serial No. 60/352,560 filed on Jan. 31, 2002 contents of which are hereby incorporated by reference.

FIELD OF THE INVENTION

The present invention relates to an approach for preventing dings and dents of a vehicle, and more particularly to a protection system that adjustably attaches to the vehicle's door.

BACKGROUND OF THE INVENTION

For most consumers, an automobile is a substantial financial investment. Thus, motorists aim to care for their automobiles to preserve the automobiles' appearance as well as operation. A rampant problem is the occurrence of dings and dents, which arise from the carelessness of other motorists when opening the doors of their cars. These careless acts may appear innocent; however, the resulting damage or abrasions to the sides of the automobiles entail significant repair costs. Motorists, thus, self-impose the inconvenience of parking far away from other cars to avoid the possibility of receiving a ding on their cars. Because of the expense in terms of actual cost and time, a large number of automobile owners leave these dings and dents unrepaired, despite being disheartened by the marred appearance of the car. Therefore, prevention is the best course of action.

A number of techniques have been developed to avoid or minimize dings and dents. These conventional techniques suffer from many drawbacks. Conventional apparatuses that cover the sides of the cars are unwieldy to engage and are time consuming. Consequently, the motorist is not likely to deploy the device, particularly if the motorist is parking for a very short time. In addition, these devices lack compactness, and thus, cannot be easily stored. Further, such devices are aesthetically displeasing, detracting from the appearance of the car. Also, these devices can only be placed at one position on the side of the car and are unable to adapt to adjacent cars of varying heights. These devices are also inflexible in that they may need to be custom manufactured for different car makes and models, as the lengths of car doors vary. Further, the complexity of some of these conventional devices require expensive manufacturing processes. Some of these traditional devices are described below.

U.S. Pat. No. 4,871,205 to Bray provides a finish protection apparatus that includes unitary first and second elongated sections, triangular in cross sections joined by a living hinge such that the first and second elongated sections are normally aligned in an operational configuration. These elongated sections may be folded together at the hinge. Each of the first and second elongated sections includes magnets distributed along its length to facilitate removably affixing the apparatus to the side of a vehicle by magnetic attraction. One key drawback of the Bray design is that the length of the sections cannot be readily adjusted. Another drawback is that the magnetic strips along the section to secure the sections may themselves introduce scratches to the delicate paint of the automobile.

U.S. Pat. No. 6,179,354 to Bennett, Jr. involves a vehicle body side protector that includes a row of panels having a pair of opposite end panels and at least one middle panel interposed between the end panels. Each of the panels is pivotally coupled to the adjacent panels in the row of panels. This design extends to the entire length of the car, consequently, the appearance of the car is greatly diminished. Additionally, this protector is not compact and lacks flexibility in the height adjustment.

U.S. Pat. No. 4,002,363 to James provides an apparatus that includes a number of elongate members disconnectably joined together by resilient elongatable means to form an array which extends alongside an automobile. Attachment members are provided at both ends of the array for attachment to locations such as the wheel openings in the fenders of an automobile. The resilient interconnection of the separate elongate members allows the members to be folded back alongside one another when removed from the outside of an automobile. One drawback of this approach is that the apparatus requires a complex arrangement of parts, which may result in high manufacturing costs. In addition, the apparatus is inflexible with respect to any height adjustment. Although the members can be folded, the folded configuration is still bulky. Further, because a number of engagement points exist, it may require significant time to deploy the apparatus.

U.S. Pat. No. 2,889,165 to Zientara provides a rubber tube of a fixed length that attaches to the edges of the vehicle door for protection. The length of the single tube extends almost entirely along the door panel. A key drawback of this design is that the fixed length does not permit ease of storage. Also the fixed length does not provide for vertical adjustment of the position of the tube, as the length of the vehicle door varies with the vertical position. Additionally, the rubber tubing is aesthetically displeasing when placed along the car. Further, deployment of the rubber tube along side the car is unwieldy, in large part, because of the length.

Therefore, there is a need for a protective apparatus that is easy to engage, compact, costeffective, and does not detract from the appearance of the automobile.

SUMMARY OF THE INVENTION

These and other needs are addressed by the present invention, in which an apparatus is provided for minimizing dings and dents on the side of a vehicle. The protective apparatus includes telescopic members attachably engaged on the edges of a door of a vehicle, wherein the height of the apparatus is adjustable.

In one aspect of the present invention, an apparatus for protecting a vehicle is disclosed. The apparatus includes a first member coupled to a strip having a malleable hook. The apparatus also includes a second member telescopically housing the first member. The second member has a strip with another malleable hook. The members are extended along a side of the vehicle door with the respective fastening means along the edges of the vehicle door.

In another aspect of the present invention, a protective device for preventing dings and dents of a vehicle door is disclosed. The protective device includes a plurality of members slidably coupled as to be housed within one of the members. The device also includes means for fastening an end of one of the members different from the housing member to a first edge of the vehicle door and for fastening an end of another one of the members different from the housing member to a second edge of the vehicle door. Further, the device includes means for providing tension among the members and the fastening means to secure the protective device horizontally along the vehicle door. The protective device is adjusted vertically along the vehicle door based upon an expected impact point of a door of a separate vehicle.

In yet another aspect of the present invention, a method for protecting a vehicle door from dings and dents is disclosed. The method includes fastening one end of a protective bar to an edge of a door, wherein the protective bar includes a plurality of members that telescopically extend and retract. The method includes extending the protective bar telescopically, and fastening another end of the protective bar to another edge of the door.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A device, and method for minimizing dings and dents on a side of a vehicle are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
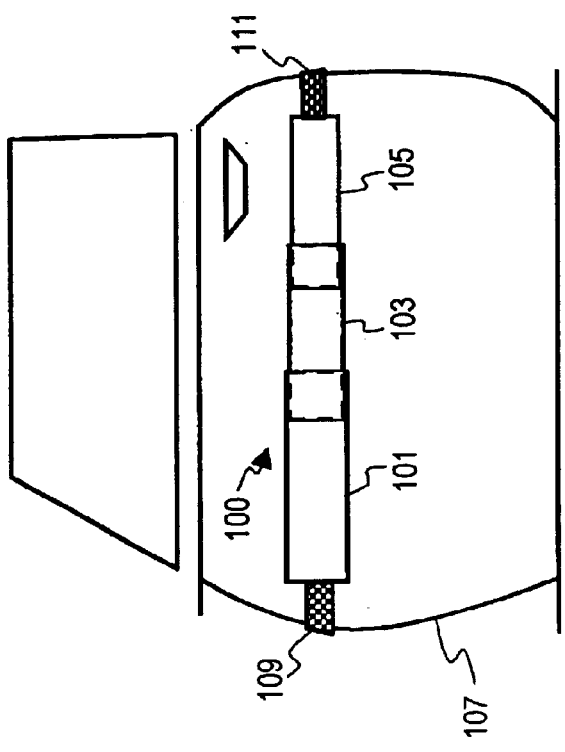
FIG. 1 is a diagram of a protective bar with telescopic members engaged on a door of a vehicle, in accordance with an embodiment of the present invention.

FIG. 1 is a diagram of a protective bar with telescopic members engaged on a door of a vehicle, in accordance with an embodiment of the present invention. A protective bar 100 includes multiple members 101, 103, 105, which extend along a door of a vehicle. The members 101, 103, 105 telescopically retract to form a compact bar that can be conveniently stored, for example, within a side door compartment (which is common in most automobiles). In an exemplary embodiment, the members 101, 103, 105 may be formed of a hard plastic material reinforced with a foam type material. The side of the members 101, 103, 105 that contacts the surface of the door is coated or layered with non-marring material, such as a soft cloth or sponge. The member 101 has a strip 109 with a fastener (e.g., hook) to attach to the edge of the left side of the door 107. An exemplary fastener is more fully described below with respect to FIG. 4. To secure the bar 100, the member 105 provides a strip 111 with a fastener to attach on the right side of the door 107. According to one embodiment of the present invention, the members 101, 103, 105, once extended, measures approximately four feet in length; the retracted length is about two feet.

The strips 109, 111 may be elastic, such that some tension exists to engage the protective bar 100 to the door 107. Alternatively, the strip 109, 111 may be made of a meshed nylon fabric that may be adjusted within the respective members 101, 105. Further, the strips 109, 111 may themselves be separately and independently adjustable.

Although a single protective bar 100 is shown, numerous configurations can be implemented to provide increased protection to the automobile. For example, multiple bars can be deployed on a single door 107 to protect the upper portion as well as the lower portion. Another configuration is to deploy a protective bar 100 on each of the doors of the vehicle. Further, although the protective bar 100 is used as a temporary shield that is to be remove once the motorist is ready to move the automobile, the bar 100 is sufficiently secure to remain engaged until the motorist wishes to remove it.

For the point of view of aesthetics, the protective bar 100 may be manufactured in a variety of color schemes to blend in with the appearance of the car. Moreover, in some cases, customization can be performed to match the exact color of the automobile—this approach is particularly suitable for high-end luxury automobiles.

The above arrangement advantageously permits vertical adjustment of the protective bar 100 along the door 107. For example, if a motorist were to be parked next to a vehicle that is higher (e.g., a sports utility vehicle), then the upper area of the door 107 would be more susceptible to contact by the adjacent vehicle. If the adjacent car is lower (e.g., a sports car), then the lower portion of the door 107 is likely to receive a ding. Another advantage is that the telescopic mechanism of the protective bar 100 permits easy engagement to the door 107 as well as storage. Additionally, because the protective bar 100 is confined to the door 107, a motorist can conveniently deploy the bar 100 without having to walk along side the car. That is, the motorist can simply extend the bar 100 and attach it to the door 107 without moving his/her feet, which is tremendously convenient and fast, thereby does not discourage from deploying the bar 100. Further, by focusing on minimizing dings and dents at the door 107, the appearance of the automobile is nominally impacted, as the fender areas tend to convey greater aesthetic appeal (and thus differentiates the makes and models of the automobile). Yet another advantage is that the fasteners on the strips 109, 111 cannot be easily removed, thus preventing theft of the protective bar 100.

Figure 2:
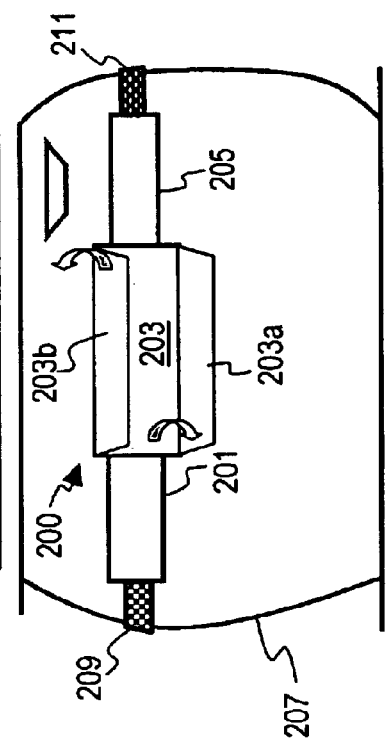
FIG. 2 is a diagram of a protective bar with fold-out wings to enlarge the protective area, according to an embodiment of the present invention.

FIG. 2 is a diagram of a protective bar with foldout wings to enlarge the protective area, according to an embodiment of the present invention. In this embodiment, a protective bar 200 includes telescopic members 201, 203, 205. The middle member 203 has two foldout wings 203a, 203b to provide a greater protective area. In an exemplary embodiment, the middle member is approximately two feet in length; alternatively, the middle member can be of a length that permits conveniently stowing away the retracted protective bar 200 within the storage area along the interior of a car door. The wings 203a, 203b, in an exemplary embodiment, have non-marring surfaces so that contact with the surface of the door 207 does cause damage. Similar to the bar 100 of FIG. 1, the strips 209, 211 include fasteners (e.g., hooks) to engage the door 207.

In another embodiment of the present invention, the members 201, 203, 205 may each contain a flap (not shown) that extends perpendicularly outward to move the contact point further away from the door 207; the contact point being the first point that an adjacent car's door (or foreign object) may impact the door 207.

Figure 3:
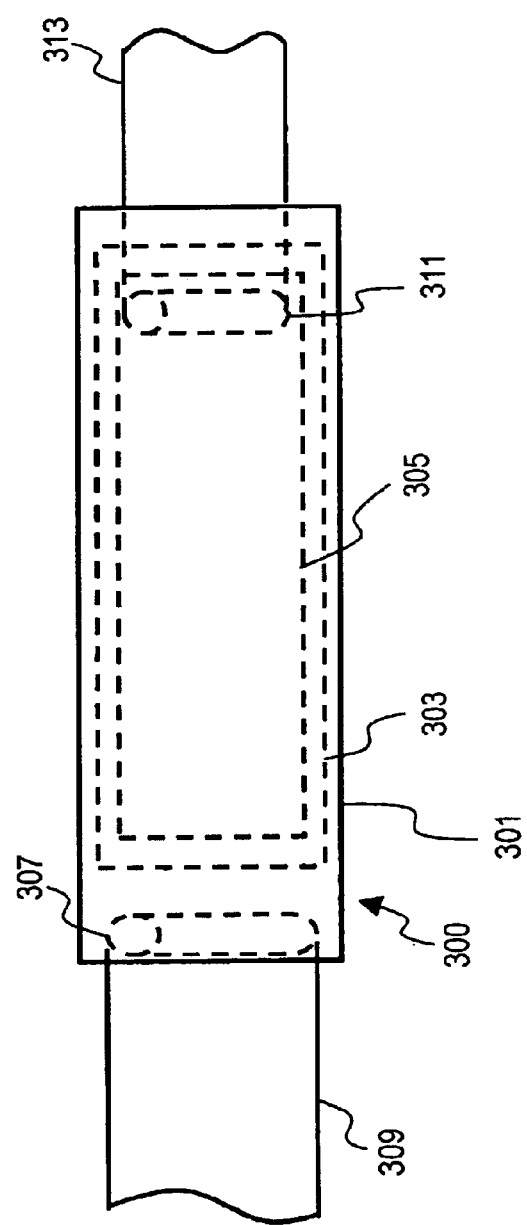
FIG. 3 is a diagram of a retracted protective bar, according to an embodiment of the present invention.

FIG. 3 is a diagram of a retracted protective bar, according to an embodiment of the present invention. In a retracted form, a protective bar 300 is a compact unit that can be conveniently stored. A member 301 may house, partially or in total, two other members 303, 305; these members 301, 303, 305 telescopically slide into each other. As shown, the member 301, includes a roller 307 that attaches to a strip 309. The roller 307, in an exemplary embodiment, reels in a portion (or all) of the strip. Similarly, the member 305 has a roller 311 that couples to a strip 313.

Figure 4:
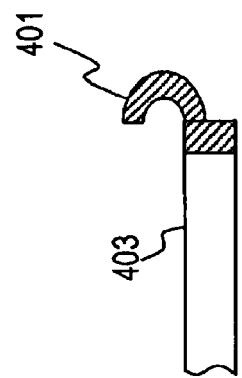
FIG. 4 is a diagram of a fastener used in a protective bar, according to an embodiment of the present invention.

FIG. 4 is a diagram of a fastener used in a protective bar, according to an embodiment of the present invention. In this example, a hook 401 connects to a strip 403. The hook 401 may be made of a deformable, yet firm material to secure an edge of a vehicle's door. Any type of fasteners may be used; e.g., any object that can be trapped or secured by the closing of the door.

Figure 5:
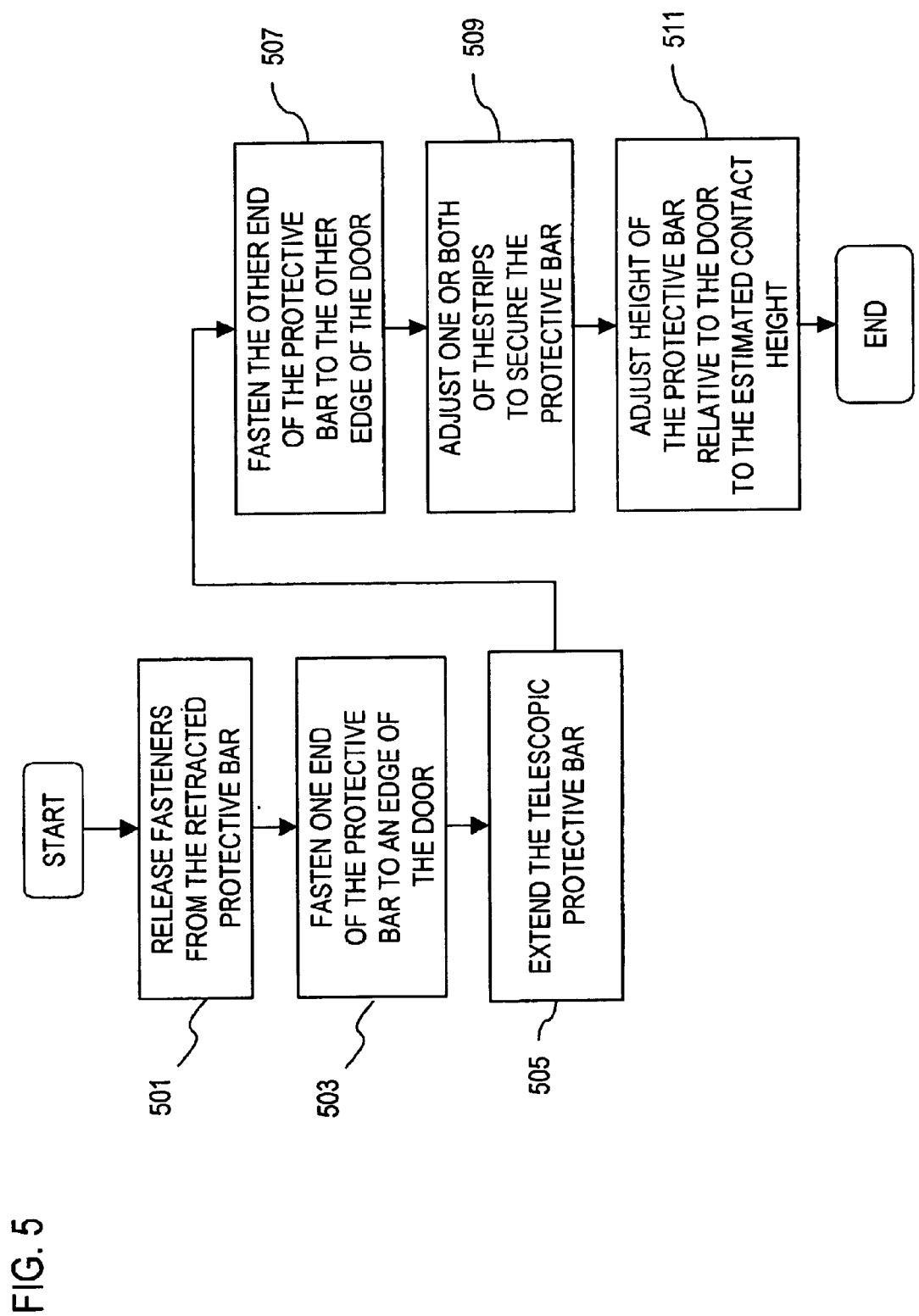
FIG. 5 is a flow diagram of a process for engaging a protective bar, in accordance with an embodiment of the present invention.

FIG. 5 is a flow diagram of a process for engaging a protective bar, in accordance with an embodiment of the present invention. By way of example, the engagement of the protective bar 100 of FIG. 1 is described. In step 501, the fasteners associated with strips 109, 111 are released such that they can be manipulated. With the door open, the motorist, as in step 503, fastens one end of the bar 100 to an edge of the door 107; in this case, the left side of the door is secured with the strip 109. Next, the bar 100 is extended, per step 505. Thereafter, in step 507, the other end of the bar 100 can be fastened to the other end of the door 107 (i.e., right edge). At this point, the strips 109, 111 may be adjusted to secure the protective bar 100 firmly to the surface of the door 107 (per step 509). In step 511, the height of the protective bar 100 is adjusted relative to the door of an adjacent vehicle such that the estimated contact area is squarely within the bar 100.

Figure 6:
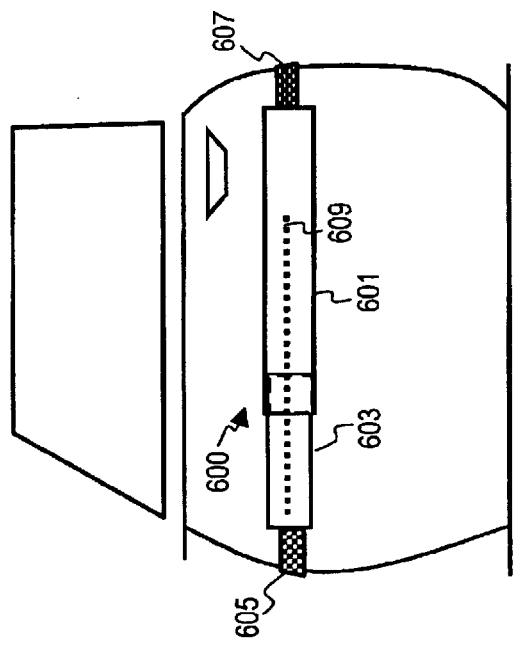
FIG. 6 is a diagram of a protective bar with two telescopic members engaged on a door of a vehicle, in accordance with an embodiment of the present invention.

FIG. 6 shows a diagram of a protective bar with two telescopic members engaged on a door of a vehicle, in accordance with an embodiment of the present invention. Under this example, the protective bar 100 has two members 601, 603 that telescopically and slidably couple to each other. The larger member 601 houses the smaller member 603, which has a strap 605 that attaches to the front edge of the door. The larger member 601 has a strap 607 that secures to the back edge of the door.

The two members 601, 603 maintain their relative positions through the use of a means for providing tension for the entire protective bar 600, such that the straps 605, 609 are stable, while the relative position of the members 601, 603 are held. This tension means 609, in an exemplary embodiment, is a spring having a spring constant that is specified according to the length of the members 601, 603 as well as the material properties (e.g., elasticity, length, etc.) of the straps 605, 609.

Because the protective bar 600 utilizes two members 601, 603, the deployment of the bar 600 onto the door can be rapidly performed, and easily retracted for stowing.

Figure 7:
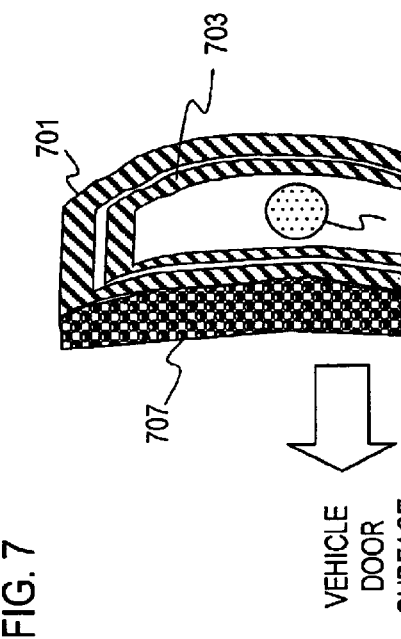
FIG. 7 is a diagram of a side view of the protective bar of FIG. 6, according to one embodiment of the present invention.

FIG. 7 shows a diagram of a side view of the protective bar of FIG. 6, according to one embodiment of the present invention. As shown, an outer member 701 corresponds to the larger member 601 (of FIG. 6), while the inner member 703 corresponds to the smaller member 603. The tension means (e.g., spring) 705 is situated within the inner member 703. In an exemplary embodiment, a non-abrasive layer 707 is provided between the outer member 701 and the. exterior of the vehicle door surface. The non-abrasive layer 701 can be deformable for conforming to the curvature of the vehicle door, while providing high absorption of the impact from the force of another vehicle door contacting the protective bar. As shown, the members 701, 703 are convex to provide an aesthetically pleasing appearance; however, if manufacturing costs are concerned, these members can be simply rectangular, as shown in FIG. 8.

Figure 8:
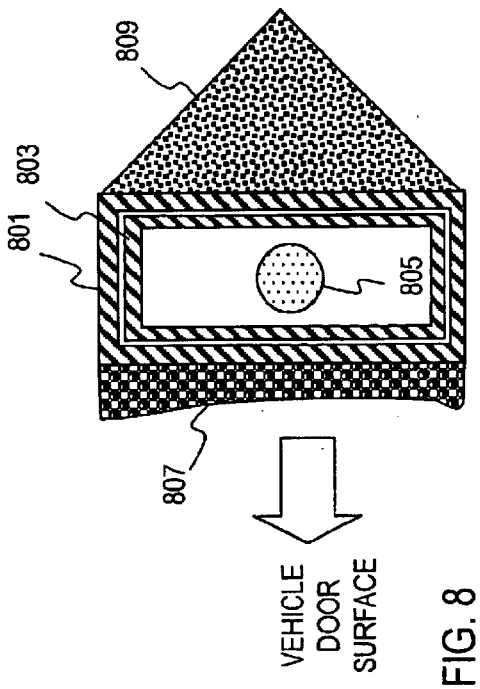
FIG. 8 is a diagram of a side view of the protective bar of FIG. 6 in which an additional protective member is applied, according to one embodiment of the present invention.

FIG. 8 shows a diagram of a side view of the protective bar of FIG. 6 in which an additional protective member is applied, according to one embodiment of the present invention. The outer member 801 corresponds to the larger member 601 (of FIG. 6). The inner member 803 corresponds to the smaller member 603; and the tension means (e.g., spring) 805 is housed within the inner member 803. This example also provides a non-abrasive layer 807 for impact absorption. Additionally, an exterior layer 809 can be overlaid onto the outer member 803, such that the apex of the exterior layer 809 extends beyond the curvature of the vehicle door, irrespective of the positioning of the protective bar. In this manner, it is ensured that the point of impact is the apex of the exterior layer 809, and not any part of the door. Although a triangular layer 809 is shown, it is contemplated that any shape can be utilized (e.g., rectangular, polygonal, etc.). Alternatively, the layer 809 is removable, thereby enhancing the aesthetics and functionality.

Accordingly, a convenient, compact, and cost-effective mechanism for preventing or minimizing dings and dents is provided.

While the present invention has been described in connection with a number of embodiments and implementations, the present invention is not so limited but covers various obvious modifications and equivalent arrangements, which fall within the purview of the appended claims.

What is claimed is:

1. An apparatus for protecting a vehicle door, comprising:
a first member coupled to a strip having a malleable hook;
a second member telescopically housing the first member, the second member having a strip with another malleable hook, wherein the members are extended along a side of the vehicle door with the respective hooks along the edges of the vehicle door; and
a wing disposed on an exterior surface of the second member and configured to foldout from the second member.

2. An apparatus according to claim 1, wherein the second member has a length greater than the first member as to completely house the first member.

3. An apparatus according to claim 1, wherein each of the members has an exterior surface color similar to color of the vehicle door.

4. An apparatus according to claim 1, further comprising:

a protective layer for absorbing impact being overlaid on an exterior surface of the second member.

5. An apparatus according to claim 4, wherein the protective layer is made of a deformable material.

6. An apparatus according to claim 4, wherein the protective layer has a thickness that permits vertical placement of the apparatus any where along the vehicle door, whereby apex of the protective layer is a first point of contact for a door of a separate vehicle.

7. An apparatus according to claim 1, further comprising:

means for providing tension between the members as to temporarily hold relative positions of the members along the side the vehicle door.

8. A protective device for preventing dings and dents of a vehicle door, comprising:

a plurality of members being slidably coupled as to be housed within one of the members;

means for fastening an end of one of the members different from the one member housing the plurality of members to a first edge of the vehicle door and for fastening an end of another one of the members different from the one housing member to a second edge of the vehicle door; and means for providing tension among the members and the fastening means to secure the protective device horizontally along the vehicle door, wherein the protective device is adjusted vertically along the vehicle door based upon an expected impact point of a door of a separate vehicle, and the one housing member having a wing disposed on an exterior surface of the one housing member, the wing extending from the one housing member.

9. A device according to claim 8, wherein the housing member has a length for completely housing the other members.

10. A device according to claim 8, wherein each of the members has an exterior surface color similar to color of the vehicle door.

11. A device according to claim 8, wherein the housing member has a convex exterior surface.

12. A device according to claim 11, wherein an apex of the convex exterior surface of the housing member extends beyond any surface of the vehicle door irrespective of vertical placement of the protective device along the vehicle door.

13. A device according to claim 8, wherein the housing member has an exterior surface made of a deformable material.

14. A device according to claim 8, wherein the fastening means includes hooks for attachment to the edges of the vehicle and straps for coupling the hooks to the ends of the respective members.

15. A device according to claim 8, wherein the length of the housing member is two feet.

16. A device according to claim 8, wherein the length of the members upon extension is about four feet.

17. A method for protecting a vehicle door from dings and dents, the method comprising:

fastening one end of a protective bar to an edge of a door, wherein the protective bar includes a plurality of members that telescopically extend and retract, one of the members including a wing disposed on an exterior surface of the one member, the wing folding out from the one member;

extending the protective bar telescopically; and fastening an end of the protective bar to an edge of the door.

18. A method according to claim 17, further comprising:

adjusting vertical position of the protective bar based upon expected impact by a door of a separate vehicle.

19. A method according to claim 17, further comprising:

selectively attaching a protective layer onto the protective bar as to provide a first point of impact by a door of a separate vehicle.

20. A method according to claim 19, wherein the protective layer is made of a deformable material.

* * * * *